US006859861B1

(12) United States Patent
Rhodes

(10) Patent No.: US 6,859,861 B1
(45) Date of Patent: Feb. 22, 2005

(54) SPACE DIVISION WITHIN COMPUTER BRANCH MEMORIES

(75) Inventor: David L. Rhodes, Brick, NJ (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 892 days.

(21) Appl. No.: 09/231,041

(22) Filed: Jan. 14, 1999

(51) Int. Cl.[7] .............................................. G06F 12/00
(52) U.S. Cl. ........................ 711/119; 711/5; 711/117; 711/129; 711/122; 711/170
(58) Field of Search ................................. 711/117, 118, 711/119, 120, 121, 122, 129, 130, 170, 171, 172, 173, 5

(56) References Cited

U.S. PATENT DOCUMENTS

| 5,193,166 A | * | 3/1993 | Menasce ............... 711/120 |
| 5,434,992 A | * | 7/1995 | Mattson ............... 711/119 |
| 5,537,635 A | * | 7/1996 | Douglas ............... 711/129 |
| 5,696,932 A | * | 12/1997 | Smith ................. 711/118 |
| 5,737,750 A | * | 4/1998 | Kumar et al. ......... 711/129 |
| 5,787,267 A | * | 7/1998 | Leung et al. ......... 711/105 |

OTHER PUBLICATIONS

Jim Handy "The Cache Memory Book", Academic Press, pp 87–91, 1993.*

* cited by examiner

Primary Examiner—Hong Kim
(74) Attorney, Agent, or Firm—Michael Zelenka; George B. Tereschuk

(57) ABSTRACT

Cache memory structures are arranged to further alleviate the continually increasing memory latency or delay problem caused by the ever increasing speed of computer processors. In these memory structures, a plurality of separate and independent memory branches are extended from a common bus that passes from a hierarchical level immediately above the processor. Each memory branch is initiated with a cache memory unit and ascends hierarchically to the main memory. Other intermediate cache memory units may be disposed in the branches between the initial cache memory unit and the main memory thereof. Memory space division may be applied to the intermediate cache memory units or the relative information storage capacities thereof may be sized to alleviate the memory latency or delay problem still further.

7 Claims, 3 Drawing Sheets

SPACE DIVISION WITHIN COMPUTER BRANCH MEMORIES

GOVERNMENT INTEREST

The invention described herein may be manufactured, used, and licensed by or for the United States Government for governmental purposes without payment to me of any royalties thereon.

BACKGROUND OF THE INVENTION

The present invention relates to computer systems, particularly those having cache memories.

Basically, a computer system includes a processor and a memory. Data and/or instructions (hereinafter referred to as information) are written into and read from the memory by the processor. To expedite computer operations, the memory in most modern computer systems includes a main memory and at least one cache memory which is disposed between the main memory and the processor. As is well known in the computer arts, cache memory is utilized to store the information most frequently involved with the operations of the computer system. Consequently, the information storage capacity of the cache memory is much smaller than that of the main memory and therefore, the very nature of the cache memory is to expedite information access and thereby speed up the operations of the computer system. Although cache memories have been particularly arranged in the prior art to expedite computer operations, the ever increasing speed of processors renders it desirable to further improve memory arrangements for expediting computer operations.

SUMMARY OF THE INVENTION

It is the general object of the present invention to expedite memory access in computer systems by incorporating separate and independent cache memory branch structures therein.

It is a specific object of the present invention to accomplish the above stated general object with cache memories incorporated on a plurality of hierarchical levels in the cache memory branch structures.

It is another specific object of the present invention to accomplish the above stated general object with memory space divisions incorporated into the cache memory branch structures.

It is still another specific object of the present invention to accomplish the above stated general object with cache memories having particularly sized information storage capacities incorporated into the cache memory branch structures.

These and other objects are accomplished in accordance with the present invention, by incorporating cache memories into branches that extend from common buses which pass on hierarchical levels above the processor. Each branch may be initiated with a cache memory and extends hierarchically to at least one main memory. Specific categories of information are selected for storage in each branch. In one preferred embodiment, memory space divisions are incorporated within at least one of the branches while in another preferred embodiment, cache memories sized to have unbalanced information storage capacities are utilized in at least one of the branches.

The scope of the present invention is only limited by the appended claims for which support is predicated on the preferred embodiments hereafter set forth in the following description and the attached drawings.

DESCRIPTION OF THE PREFERRED EMBODIMENTS

Figure 1:
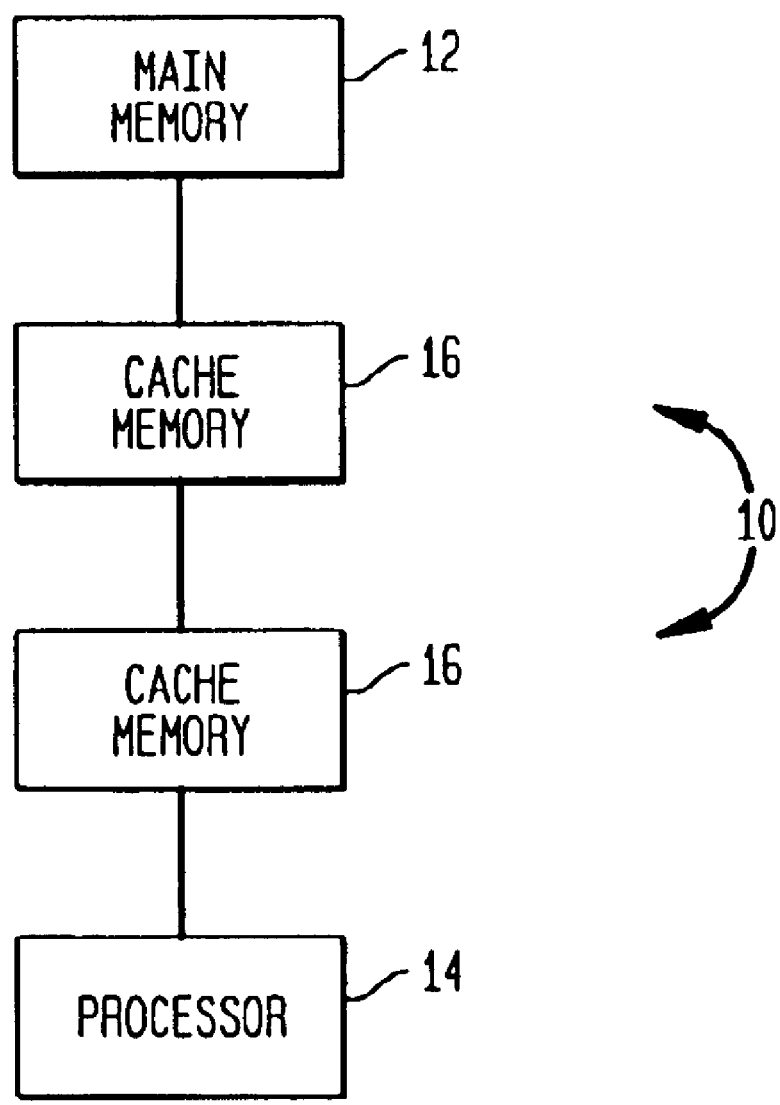
FIG. 1 illustrates a prior art computer system.

A conventional computer system 10 is shown in FIG. 1 wherein a main memory 12 is separated from a processor 14 by a linear or unbranched hierarchy which includes at least one hierarchical level of cache memory 16. As is well known in the computer arts, the cache memories 16 each contain a subset of the information stored in the main memory 12. It is also well known that the cache memories 16 most often have less information storage capacity than the main memory 12 and of course, such cache memories 16 have faster information retrieval capability.

Since use of cache memory which is slower than main memory would be detrimental to overall access time, the invention relates only to cache memory which is faster than main memory. Certainly, when the information to be retrieved is found in the cache memory 16 (hereinafter a "cache hit"), the retrieval operation is expedited. Furthermore, even if the information sought to be retrieved by the processor 14, is not found in the cache memories 16 (hereinafter a "cache miss") and it must be retrieved or fetched from the main memory 12, the cache memories 16 may cause no additional latency or delay, due to simultaneous or parallel processing. Consequently, the invention focuses on novel cache memory arrangements which further alleviate the latency or delay problem that continually arises, due to the ever increasing speed of processors 14.

Figure 2:
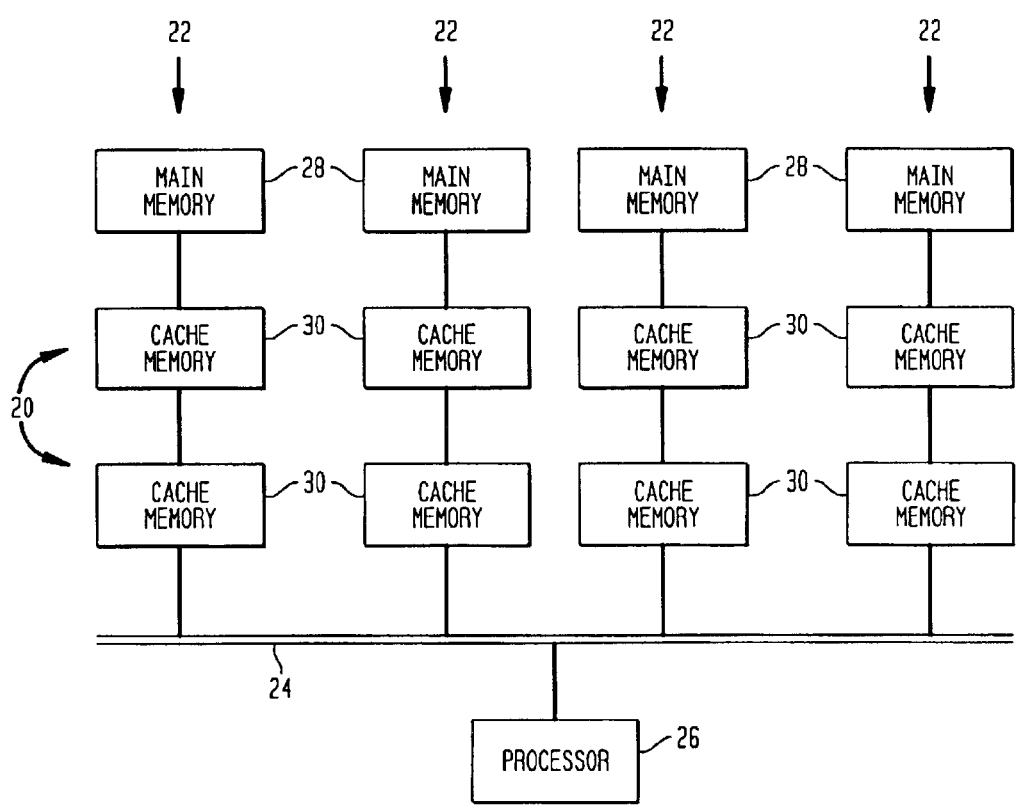
FIG. 2 illustrates a computer system wherein a plurality of separate and independent cache memory branches extend from a common bus in accordance with the invention.

As shown in FIG. 2, the present invention relates to a computer system 20 wherein a plurality of separate and independent memory branches 22 extend from a common bus 24 that passes on a hierarchical level immediately above a processor 26. Each memory branch 22 is initiated with a cache memory unit 30 and ascends hierarchically to at least one main memory unit 28. Other intermediate cache memory units 30 may be disposed in each branch 22 between the initial cache memory unit 30 and the main memory units 28. Generally, the addresses of the information stored in each memory branch 22 are distinctive relative to the addresses of the information stored in all of the other memory branches 22. Therefore, when an address is applied to the common bus 24 by the processor 26, if information is stored at that address in cache memory, it is retrieved by the processor 26 from only one of the memory branches 22. Of course, each cache memory unit 30 has less information storage capacity than the main memory unit 28 associated therewith in the memory branch 22. Consequently, each cache memory unit 30 may enjoy a higher hit-rate (or a lower miss-rate) than does the main memory unit 28 associated therewith.

In one preferred embodiment of the invention, at least one cache memory unit 30 is disposed on at least one intermediate hierarchical level in at least one branch 22, as shown in FIG. 2. Of course, each intermediate cache memory unit 30 has less information storage capacity than the main memory unit 28 associated therewith. Consequently, the overall memory access speed of the computer system 20 may be enhanced by such intermediate cache memory units 30.

Figure 3:
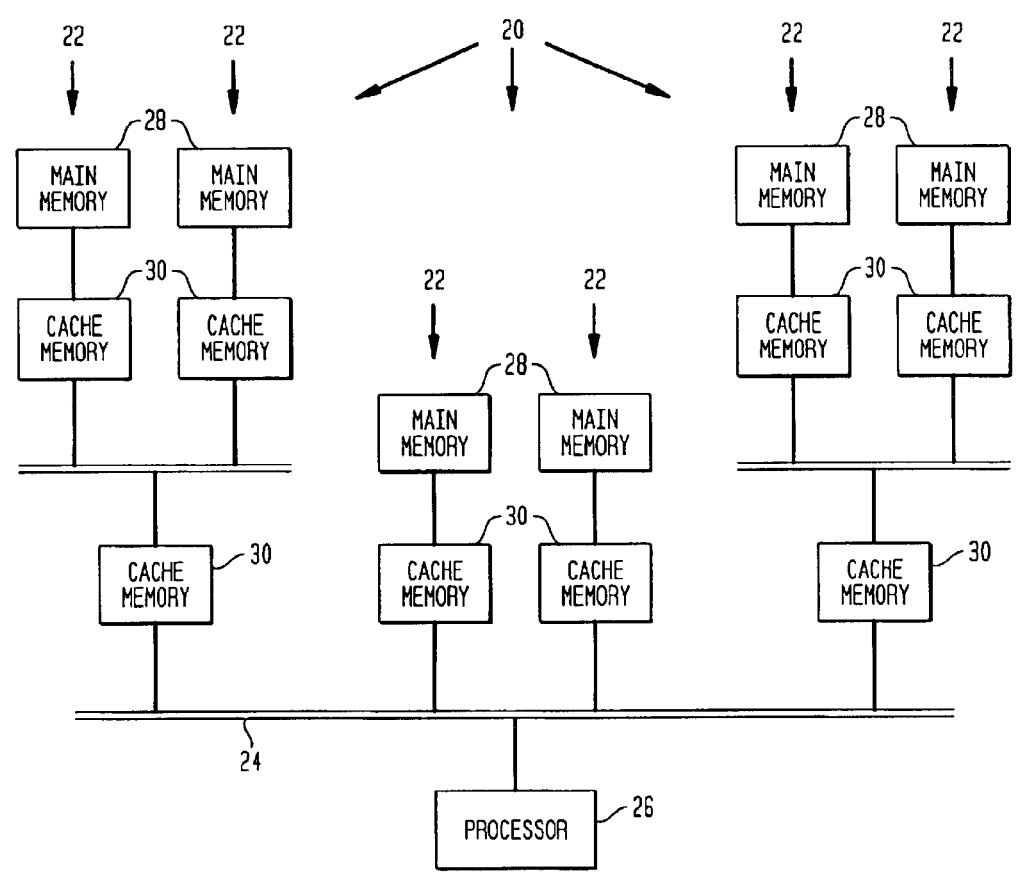
FIG. 3 illustrates a computer system in accordance with embodiments of the invention wherein hierarchical levels of intermediate cache memory, memory space division, and unbalanced information storage capacity are utilized.

Other preferred embodiments of the invention are illustrated in FIG. 3. In one of these embodiments, the combination of main memory and cache memory in at least one memory branch 22, includes at least one hierarchical level of multiple cache memory units 30, in a memory space division arrangement that essentially provides structural separation within the cumulative cache memory at those hierarchical levels. Because each cache memory unit 30 in the memory space division arrangement is faster than the main memory unit 28 associated therewith, the overall memory access speed of the computer system 20 may be enhanced by each memory space division arrangement. Consequently, improved hit rates are probable with such memory space division arrangements, as compared to the cumulative cache memory at those hierarchical levels. This is so even when the information storage capacity of the cumulative cache memories at those levels is equivalent to the sum of the information storage capacity in the multiple cache memory units 30 at those hierarchical levels. Each branch 22 into which the memory space division arrangements are incorporated in FIG. 3, also incorporates main memory space division at the highest hierarchical level. Although such main memory space division constitutes another embodiment of the invention, the cache memory units 30 on the hierarchical level immediately below the hierarchical level of the memory, could remerge into a single main memory unit 28 in still another embodiment of the invention.

FIG. 3 illustrates still another preferred embodiment of the invention, wherein the information storage capacities of the cache memories 30 in at least one of the cache memory space divisions are unbalanced. Consequently, one cache memory 30 in each cache memory space division contains less information storage capacity than the other cache memory 30 associated therewith. Therefore, each unbalanced cache memory space division enhances the overall memory access speed of the computer system.

Those skilled in the art will appreciate without any further explanation that within the concept of this invention many modifications and variations are possible to the above disclosed embodiments of the memory system. It will also be understood that the disclosed invention is compatible with all existing cache policies. Consequently, it should be understood that all such variations and modifications fall within the scope of the following claims.

What I claim is:

1. In a computer system of the type wherein a processor directs information to and retrieves information from a memory which includes main memory and cache memory, the improvement comprising:

a plurality of separate and independent memory branches extend from a common bus that passes at a hierarchical level immediately above the processor and a combination of main memory and cache memory is included in each branch, with at least one branch having at least one hierarchical level of multiple cache memory units in a memory space division.

2. The computer system of claim 1 wherein each branch is initiated with a cache memory unit.

3. The computer system of claim 2 wherein at least one of the memory branches includes at least one cache memory unit disposed on at least one intermediate hierarchical level between the initial cache memory unit and at least one main memory unit.

4. The computer system of claim 1 wherein the memory storage capacities of the cache memory units, in the at least one of the memory branches with at least one division of memory space divisions, are unbalanced.

5. The computer system of claim 1 wherein at least one cache memory in at least one memory branch is particularly sized in accordance with the magnitude of information to be stored therein.

6. The computer system of claim 3 wherein at least one of the cache memory units is unbalanced relative to at least one other cache memory unit.

7. The computer system of claim 3 wherein the cache memory units on intermediate hierarchical levels in at least one memory branch are unbalanced.

* * * * *